(12) United States Patent
Sakamoto et al.

(10) Patent No.: US 9,997,140 B2
(45) Date of Patent: Jun. 12, 2018

(54) CONTROL METHOD, INFORMATION PROCESSING DEVICE AND RECORDING MEDIUM

(71) Applicant: FUJITSU LIMITED, Kawasaki-shi, Kanagawa (JP)

(72) Inventors: Takuya Sakamoto, Kawasaki (JP); Hidenobu Ito, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 124 days.

(21) Appl. No.: 14/883,755

(22) Filed: Oct. 15, 2015

(65) Prior Publication Data
US 2017/0110095 A1 Apr. 20, 2017

Related U.S. Application Data

(63) Continuation of application No. PCT/JP2013/002684, filed on Apr. 22, 2013.

(51) Int. Cl.
*G06T 11/60* (2006.01)
*G09G 5/377* (2006.01)
(Continued)

(52) U.S. Cl.
CPC ............ *G09G 5/377* (2013.01); *G06K 9/325* (2013.01); *G06T 7/74* (2017.01); *G09G 5/14* (2013.01);
(Continued)

(58) Field of Classification Search
CPC ............................. G06T 19/006; G06T 11/60
See application file for complete search history.

(56) References Cited

U.S. PATENT DOCUMENTS 8,830,267 B2 * 9/2014 Brackney ............... G06Q 10/06
345/632
9,189,514 B1 * 11/2015 Myslinski .......... G06Q 30/0255
(Continued)

FOREIGN PATENT DOCUMENTS

JP 10-254614 A 9/1998
JP 2007-120973 A 5/2007
(Continued)

OTHER PUBLICATIONS

Japanese Office Action dated Sep. 27, 2016 in Patent Application No. 2015-513357 (with English Translation).
(Continued)

*Primary Examiner* — Phi Hoang
(74) *Attorney, Agent, or Firm* — Oblon, McClelland, Maier & Neustadt, L.L.P.

(57) ABSTRACT

A control method executed by a processor included in an information processing device includes receiving a content; extracting one or more keywords of the content from the content; acquiring information in which an identifier identifying a target object, image information on the target object, and one or more keywords of the target object are associated; calculating a position of the target object on a camera image, based on the image information, when the target object is included in the camera image; calculating a display position of an image relating to the content, based on the position of the target object, when the one or more keywords of the content and the one or more keywords of the target object have a correspondence relationship; and displaying the image relating to the content on a screen, in a state of being superimposed onto the camera image, at the display position.

11 Claims, 20 Drawing Sheets

(51) Int. Cl.
  *G09G 5/373* (2006.01)
  *G06K 9/32* (2006.01)
  *G09G 5/14* (2006.01)
  *G06T 7/73* (2017.01)

(52) U.S. Cl.
  CPC .... *G09G 5/373* (2013.01); *G06T 2207/20212* (2013.01); *G09G 2340/12* (2013.01); *G09G 2340/14* (2013.01); *G09G 2354/00* (2013.01); *G09G 2370/042* (2013.01)

(56) References Cited

U.S. PATENT DOCUMENTS

| | | | |
|---|---|---|---|
| 2007/0100510 A1 | 5/2007 | Matsuoka | |
| 2009/0096875 A1 | 4/2009 | Yoshimaru et al. | |
| 2009/0157696 A1* | 6/2009 | Mikawa | G06F 17/30247 |
| 2009/0289956 A1 | 11/2009 | Douris et al. | |
| 2009/0327689 A1* | 12/2009 | Lazar | G06F 9/44505 |
| | | | 713/100 |
| 2010/0257195 A1 | 10/2010 | Inoue et al. | |
| 2011/0038512 A1 | 2/2011 | Petrou et al. | |
| 2012/0290974 A1* | 11/2012 | Doig | G06F 17/3089 |
| | | | 715/808 |
| 2013/0051615 A1 | 2/2013 | Lim et al. | |
| 2013/0057582 A1 | 3/2013 | Aoki | |
| 2013/0301879 A1* | 11/2013 | Polo | G06K 9/3241 |
| | | | 382/103 |
| 2014/0059458 A1* | 2/2014 | Levien | G06F 3/04842 |
| | | | 715/765 |
| 2014/0172881 A1 | 6/2014 | Petrou et al. | |
| 2014/0267416 A1 | 9/2014 | Douris et al. | |
| 2016/0055182 A1 | 2/2016 | Petrou et al. | |
| 2016/0093106 A1* | 3/2016 | Black | G06K 9/00624 |
| | | | 345/633 |
| 2016/0162020 A1* | 6/2016 | Lehman | G06F 3/013 |
| | | | 715/835 |

FOREIGN PATENT DOCUMENTS

| | | |
|---|---|---|
| JP | 2008-250474 A | 10/2008 |
| JP | 2010-009192 A | 1/2010 |
| JP | 2011-009915 A | 1/2011 |
| JP | 2012-187236 A | 10/2012 |
| JP | 2013-003607 A | 1/2013 |
| WO | WO 2010-095426 A1 | 8/2010 |
| WO | WO 2011/017653 A1 | 2/2011 |

OTHER PUBLICATIONS

Tatsuro Matsumoto et al., "Context Desktop Technology", Fujitsu, vol. 63, No. 5, Sep. 10, 2012, pp. 531-536 (with English Translation), 12 pages.

Extended European Search Report dated Mar. 22, 2016 in Patent Application No. 13883142.5.

Frucci, Adam, "Half-Amazing, Half-Terrifying Concept App Combines Facial Recognition with Augmented Reality", Internet Citation, XP002606656, Jul. 22, 2009, pp. 1-2, URL:http://gizmodo.com/5320604/half+amazing-half+terrifying-concept-app-combines-facial-recognition-with-augmented-reality.

International Search Report dated Jul. 2, 2013 for PCT/JP2013/002684 filed Apr. 22, 2013 with English Translation.

International Written Opinion dated Jul. 2, 2013 for PCT/JP2013/002684 filed Apr. 22, 2013 with partial English Translation.

Office Action dated Jul. 7, 2016 in European Patent Application No. 13 883 142.5.

Office Action dated Feb. 24, 2017 in European Patent Application No. 13 883 142.5.

Office Action dated Mar. 7, 2017 in Japanese Patent Application No. 2015-513357 (with English language translation).

Summons to attend oral proceedings pursuant to Rule 115(1) EPC issued in corresponding European Appiication No. 133831425 dated Mar. 16, 2018.

\* cited by examiner

| DISPLAY POSITION ID | DISPLAY RANGE | | | | KEYWORD |
|---|---|---|---|---|---|
| | x | y | w | h | |
| 123 | 15 | 24 | 80 | 80 | Tanaka,document,work |
| 124 | 208 | 340 | 90 | 80 | Yoshida,document,work |
| — | — | — | — | — | — |

CONTROL METHOD, INFORMATION PROCESSING DEVICE AND RECORDING MEDIUM

CROSS-REFERENCE TO RELATED APPLICATION

This application is a continuation application of International Application PCT/JP2013/002684 filed on Apr. 22, 2013 and designated the U.S., the entire contents of which are incorporated herein by reference.

FIELD

The embodiments discussed herein are related to a control method, an information processing device, and a recording medium.

BACKGROUND

So-called context desktop technologies have been developed that switch content, such as an application, which is displayed on a desktop (a home screen) of a portable information terminal, in every context, such as in every residence or situation of a user of a portable information terminal. In the context desktop technology, for example, the portable information terminal automatically installs or automatically uninstalls content such as an application, by being triggered by an instruction from the outside, such as a server. For example, the following Non-Patent Document is disclosed in the related art.

A Press Release (technology): "Fujitsu Develops Information Device Technology to Automatically Deliver and Run Applications Needed at Particular Time and Place", Jul. 19, 2011, Fujitsu Ltd., [Internet Search available since Jul. 8, 2012 at http://pr.fujitsu.com/jp/news/2011/07/19-1.html]

However, for example, in a case where content such as an application is automatically installed by being triggered by an instruction from the outside, such as a server, because the user does not install the content of his/her own volition, it is difficult for him/her to know a usage purpose of the content, that is, a provided service or the like. For this reason, it is difficult to use the installed content effectively.

According to the disclosed technology, there is provided a method of controlling a portable information terminal, a control program, and a portable information terminal, in which the effective use of content that is downloaded on the portable information terminal can be supported.

SUMMARY

According to an aspect of the invention, a control method executed by a processor included in an information processing device coupled to a camera, the control method includes receiving a content; extracting one or more keywords of the content from the content; acquiring display target object information in which an identifier identifying a target object, image information on the target object, and one or more keywords of the target object are associated; calculating a position of the target object on a camera image captured using the camera, based on the image information on the target object, when the target object is included in the camera image; calculating a display position of an image relating to the content, based on the position of the target object, when the one or more keywords of the content and the one or more keywords of the target object have a correspondence relationship; and displaying the image relating to the content on a screen, in a state of being superimposed onto the camera image, at the display position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating one example of a display position information table according to the first embodiment;

DESCRIPTION OF EMBODIMENTS

First Embodiment

A first embodiment will be described below referring to FIGS. 1 to 13.

Figure 1:
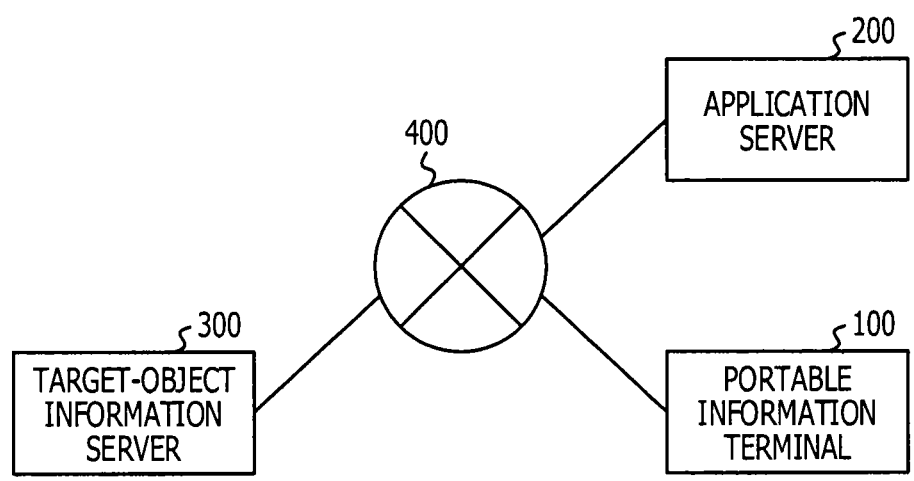
FIG. 1 is a diagram illustrating one example of an application push system according to a first embodiment.

FIG. 1 is a diagram illustrating one example of an application push system according to the first embodiment.

As illustrated in FIG. 1, the application push system according to the present embodiment includes a portable information terminal 100, an application server 200, and a target-object information server 300. The portable information terminal 100, the application server 200, and the target-object information server 300, for example, are connected to each other through a wireless or wired network 400. In the application push system, an application is automatically downloaded from the application server 200 to the portable information terminal 100. However, the application here is one example of content that includes, for example, data and the like, and is not limited to a so-called application program.

Figure 2:
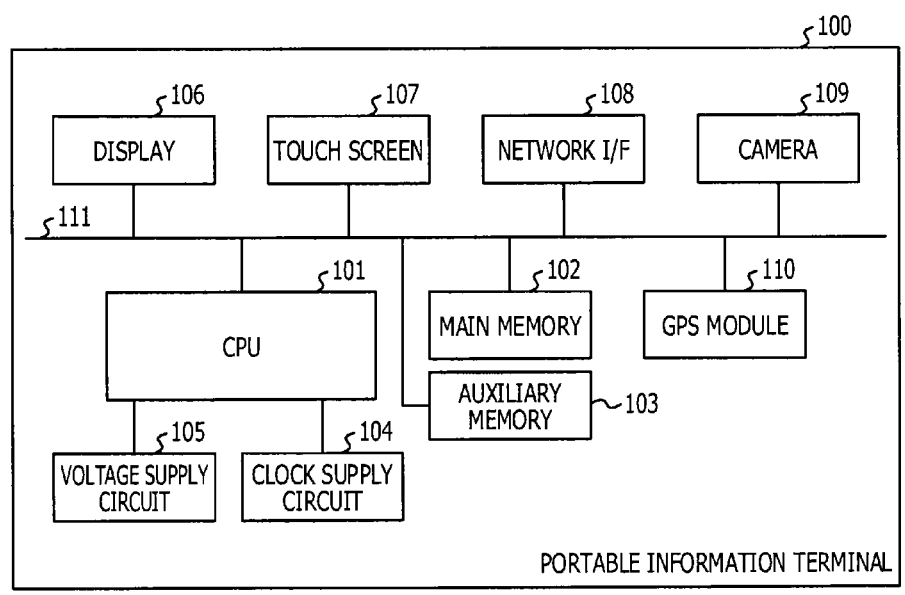
FIG. 2 is a diagram illustrating one example of a hardware configuration of a portable information terminal according to the first embodiment.

FIG. 2 is a diagram illustrating one example of a hardware configuration of the portable information terminal 100 according to the first embodiment.

As illustrated in FIG. 2, the portable information terminal 100 according to the present embodiment includes a central processing unit (CPU) 101, a main memory 102, an auxiliary memory 103, a clock supply circuit 104, a voltage supply circuit 105, a display 106, a touch screen 107, a network interface (I/F) 108, a camera 109, and a GPS module 110, as hardware modules. These hardware modules, for example, are connected to each other through a bus 111.

The CPU 101 operates with a clock signal that is supplied from the clock supply circuit 104 and a voltage that is supplied from the voltage supply circuit 105, and thus controls various hardware modules of the portable information terminal 100. Additionally, the CPU 101 reads various programs that are stored in the auxiliary memory 103 and then loads the various programs onto the main memory 102. Then, the CPU 101 executes the various programs that are loaded onto the main memory 102, and thus realizes various functions. The various functions will be described in detail below.

The various programs that are executed by the CPU 101 are stored in the main memory 102. Additionally, the main memory 102 is used as a working area, and various pieces of data to be used for processing by the CPU 101 are stored in the main memory 102. As the main memory 102, for example, a random access memory (RAM) or the like may be used.

Various programs that cause the portable information terminal 100 to operate are stored in the auxiliary memory 103. For example, the various programs include an application program or an operating system (OS) that is executed by the portable information terminal 100. An AR application (a control program) according to the present embodiment is also stored in the auxiliary memory 103. As the auxiliary memory 103, for example, a hard disk or a nonvolatile memory such as a flash memory may be used.

The display 106 is controlled by the CPU 101, and image information is displayed on the display 106 for a user. The touch screen 107 is attached to the display 106. Information on a position that a user's fingertip or a pen nib comes into contact with is input to the touch screen 107.

The network I/F 108, for example, functions as an interface for receiving a push message or an application from the application server 200 or as an interface for receiving display-target information from the target-object information server 300.

The camera 109, for example, acquires image information such as a photograph of the inside of a conference room or the like. The GPS module 110 acquires positional information (longitude, latitude, or the like) on the portable information terminal 100, based on a GPS signal from multiple satellites. According to the present embodiment, based on the GPS signal, the camera 109 acquires positional information on the portable information terminal 100. However, for example, the positional information on the portable information terminal 100 may be acquired based on a cell ID from a 3rd Generation (3G) base station, a MAC address from a Wi-Fi (a registered trademark) access point, and the like.

Figure 3:
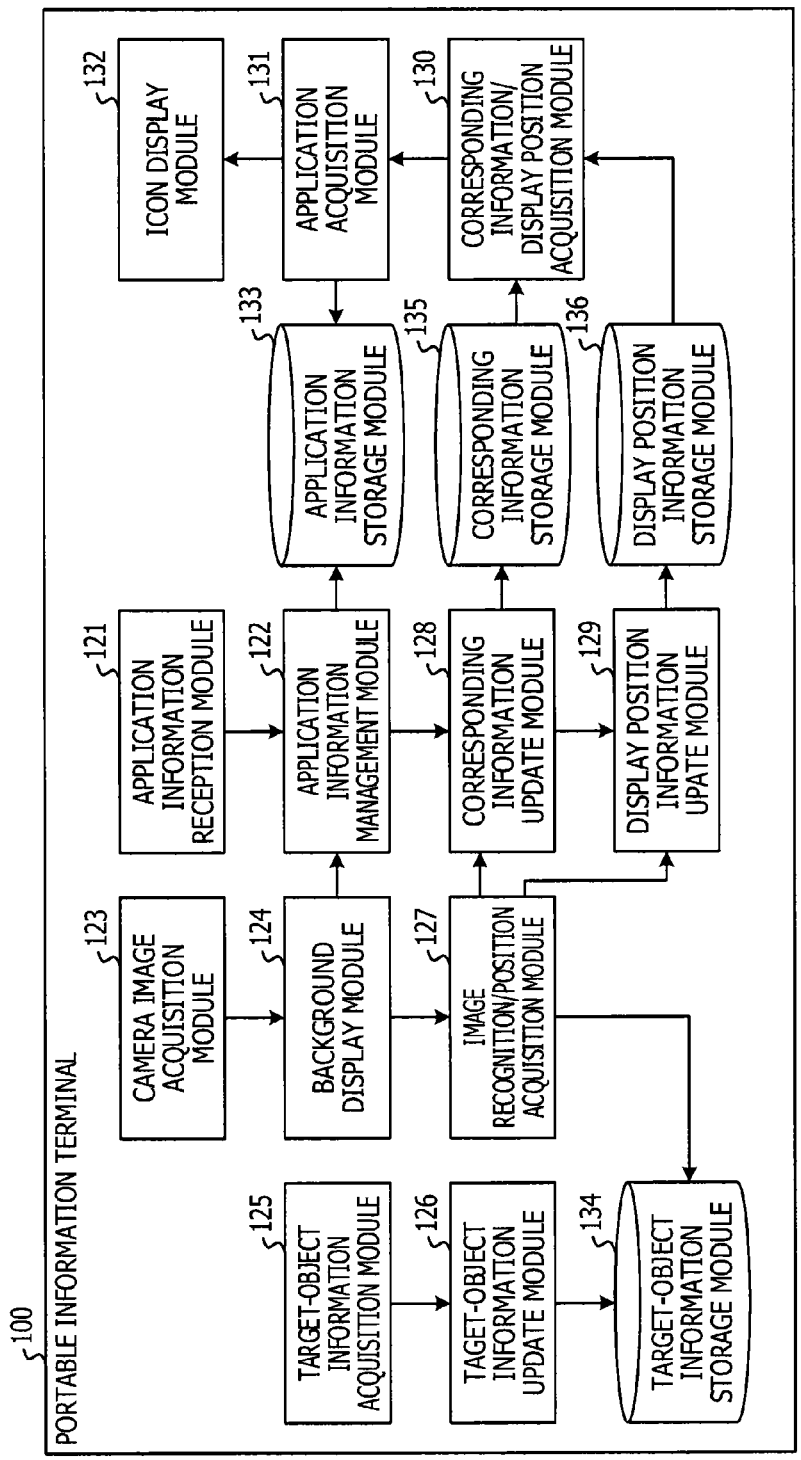
FIG. 3 is a diagram illustrating one example of a functional block of the portable information terminal according to the first embodiment.

FIG. 3 is a diagram illustrating one example of a functional block of the portable information terminal 100 according to the first embodiment.

As illustrated in FIG. 3, the portable information terminal 100 according to the present embodiment includes an application information reception module 121, an application information management module 122, a camera image acquisition module 123, a background display module 124, a target-object information acquisition module 125, a target-object information update module 126, an image recognition/position acquisition module 127, a corresponding information update module 128, a display position information update module 129, a corresponding information/display position acquisition module 130, an application acquisition module 131, an icon display module 132, an application information storage module 133, a target-target-object information storage module 134, a corresponding information storage module 135, and a display position information storage module 136, as functional blocks.

Any of these functional blocks is realized by the CPU 101 reading the AR application (the control program) into the main memory 102 and executing the AR application read into the main memory 102.

The application information reception module 121 receives a push message from the application server 200. The push messages include, for example, an instruction for installation of an application and an instruction for uninstalling an application. Additionally, the application information reception module 121 receives a compressed application-file from the application server 200, based on an installation instruction from the application server 200. The compressed application-file includes an application file and application information. The application file includes a program for realizing a function of an application. The application information includes a keyword relating to an application. As the keywords, pieces of attribute information of a program may be used such as a writer name, a type, a usage purpose, writing date and time, a writing place, and use date and time.

The application information management module 122 decompresses the compressed application-file from the application server 200 and acquires the application file and the application information. Additionally, the application information management module 122 stores the application file and the application information in an application information table T1 that is stored in the application information storage module 133. The application information management module 122 deletes an application file and application information that are designated, from the application information table T1, based on an instruction for the uninstalling from the application server 200. Additionally, the application information management module 122 acquires a keyword relating to an application from the application information table T1.

The camera image acquisition module 123 acquires an image that is captured by the camera 109, that is, a camera image.

The background display module 124 displays the camera image that is captured by the camera image acquisition module 123, as a background image, on the display 106.

The target-object information acquisition module 125 acquires display target object information from the target-object information server 300. The pieces of display target object information include a target object ID, image data, and a keyword. A target object is an object that is a target for AR display, such as an employee, a white board, or a building. The target object ID is identification information for identifying the target object. The image data is image data on the target object. The keyword is a keyword relating to the target object. As the keywords, for example, pieces of attribute information on the target object may be used such as a name and a type.

The target-object information update module 126 updates a display target object information table T2 that is stored in the target-object information storage module 134, based on the display target object information that is acquired by the target-object information acquisition module 125.

The image recognition/position acquisition module 127 acquires the image data on the target object from the display target object information table T2 that is stored in the target-object information storage module 134, and determines whether or not the target object is included on the background image which is displayed on the background display module 124. In a case where the target object is included in the background image, the image recognition/position acquisition module 127 calculates a position of the target object, based on the image data on the target object. Additionally, the image recognition/position acquisition module 127 acquires the keyword relating to the target object from the display target object information table T2.

The corresponding information update module 128 associates a target object and an application with each other, based on the keyword relating to the target object, which is acquired by the image recognition/position acquisition module 127, and on a keyword relating to the application, which is acquired by the application information management module 122. Specifically, the corresponding information update module 128 calculates the number of times that the keyword relating to the target object and the keyword relating to the application are consistent with each other. Additionally, the corresponding information update module 128 updates a corresponding information table T3 that is stored in the corresponding information storage module 135, based on a corresponding relationship (a combination) between the target object and the application, in which the number of times that the keywords are consistent with each other is maximized. That is, the corresponding information update module 128 stores the corresponding relationship between the target object and the application in which the number of times that the keywords are consistent with each other is maximized, in the corresponding information table T3.

The display position information update module 129 calculates a display position of the application, based on the position of the target object, which is acquired by the image recognition/position acquisition module 127. A display position is a range where the application can be displayed. Additionally, the display position information update module 129 updates a display position information table T4 that is stored in the display position information storage module 136, based on the display position of the application.

The corresponding information/display position acquisition module 130 acquires the corresponding relationship between the target object and the application from the corresponding information table T3 that is stored in the corresponding information storage module 135. Additionally, the corresponding information/display position acquisition module 130 acquires the display position from the display position information table T4 that is stored in the display position information storage module 136.

Based on the corresponding relationship that is acquired by the corresponding information/display position acquisition module 130, the application acquisition module 131 specifies an application that is associated with each display position and thus acquires image data of the application from the application information storage module 133. As the image data of the application, for example, an application icon may be used.

The application icon is displayed on the display position, which is acquired by the corresponding information/display position acquisition module 130, in the icon display module 132, in a superimposed manner, using the image data of the application that is acquired by the application acquisition module 131.

The application information table T1 is stored in the application information storage module 133.

The display target object information table T2 is stored in the target-object information storage module 134.

The corresponding information table T3 is stored in the corresponding information storage module 135.

The display position information table T4 is stored in the display position information storage module 136.

The application information table T1, the display target object information table T2, the corresponding information table T3, and the display position information table T4 will all be described in detail below.

Figure 4:
FIG. 4 is a diagram illustrating one example of an application information table according to the first embodiment.

FIG. 4 is a diagram illustrating one example of the application information table T1 according to the first embodiment.

As illustrated in FIG. 4, in the application information table T1, an application name, an application file, and keywords are associated with an application that is identified by each identification ID. The application name is a name of an application. The application file includes a program for realizing a function of an application. The keywords are keywords relating to the application. As the keywords, pieces of attribute information of a program may be used such as a writer name, a type, a usage purpose, writing date and time, a writing place, and use date and time. For example, in specific examples that are illustrated in the first row in a table, "shiryou 1", as an application name, "xxxx.html", as an application file, and "Tanaka (a writer name)", "document (a type)", and "work (a usage purpose)", as keywords, are associated with an application that is identified by an application ID "xxxx".

Figure 5:
FIG. 5 is a diagram illustrating one example of a display target object information table according to the first embodiment.

FIG. 5 is a diagram illustrating one example of the display target object information table T2 according to the first embodiment.

As illustrated in FIG. 5, in the display target object information table T2, image data and keywords are associated with a target object that is identified by each target object ID. The image data is image data on the target object. The keywords are keywords relating to the target object. As the keywords, for example, pieces of attribute information on the target object may be used such as a name and a type. For example, in specific examples that are illustrated in the first row in a table, "xxx.png", as image data, and "Tanaka (a writer name)", and "work (a usage purpose)", as keywords, are associated with a target object that is identified by a target object ID "aaaa".

Figure 6:
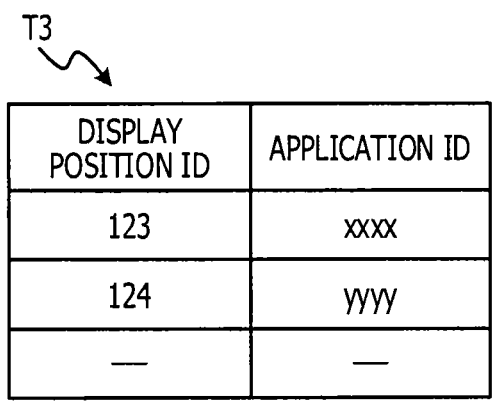
FIG. 6 is a diagram illustrating one example of a corresponding information table according to the first embodiment.

FIG. 6 is a diagram illustrating one example of the corresponding information table T3 according to the first embodiment.

As illustrated in FIG. 6, the corresponding information table associates an application that is identified by an application ID, with a display position that is identified by each display position ID. The display position is set for each target object. For example, in specific examples that are illustrated in the first row in a table, the application that is identified by the application ID "xxxx" is associated with a display position that is identified by a display position ID "123".

FIG. 7 is a diagram illustrating one example of the display position information table T4 according to the first embodiment.

As illustrated in FIG. 7, in the display position information table T4, a display range and keywords are associated with a display position that is identified by each display position ID. The display range is a range where an application can be displayed. According to the present embodiment, as the display range, coordinate components "x" and "y" that define a reference position, and a width "w" and a height "h" that define a size of the display range are used. For example, in specific examples that are illustrated in the first row in a table, (15, 24, 80, and 80), as a display range (x, y, w, and h), is associated with the display position that is identified by the display position ID "123".

Figure 8:
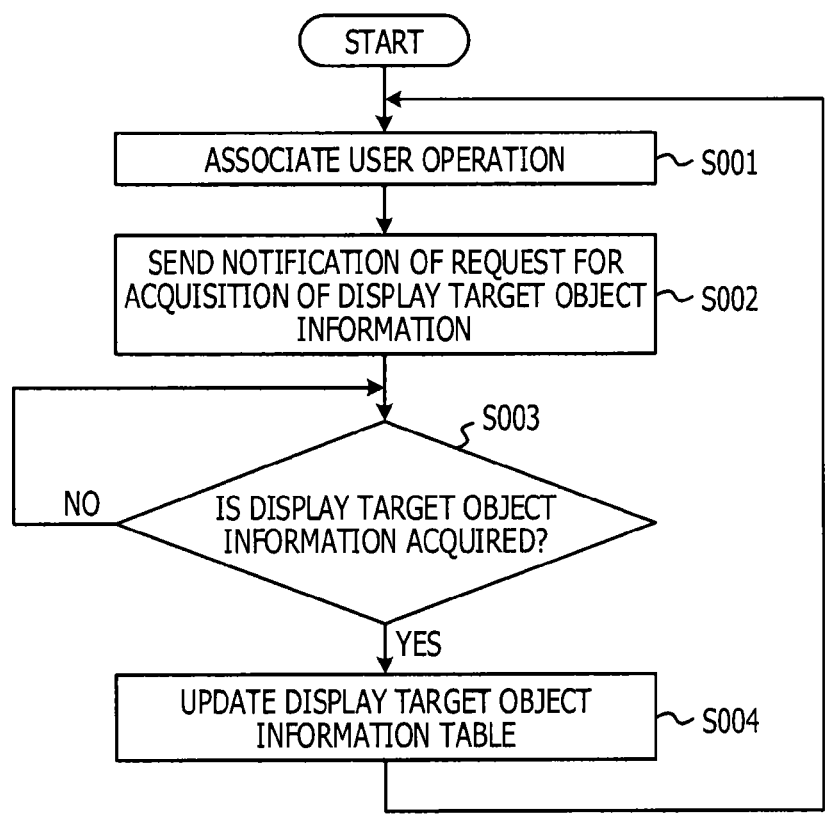
FIG. 8 is a flowchart for display-target information update processing by the portable information terminal according to the first embodiment.

FIG. 8 is a flowchart for display-target information update processing by the portable information terminal 100 according to the first embodiment.

As illustrated in FIG. 8, a user operation of the portable information terminal 100 is performed through the target-object information acquisition module 125 (S001). The user operations include, for example, an instruction for activating the AR application and an instruction for update to the AR application.

Next, the target-object information acquisition module 125 notifies the target-object information server 300 of a request for acquiring the display target object information (S002). Context information of the user of the portable information terminal 100, for example, such as positional information or schedule information of the user may be included in the request for acquiring the display target object information.

Next, the target-object information acquisition module 125 determines whether or not the display target object information is acquired from the target-object information server 300 (S003).

In a case where it is determined that the display target object information is not acquired (No in S003), the target-object information acquisition module 125 again determines whether or not the display target object information is acquired (S003).

On the other hand, in a case where it is determined that the display target object information is acquired (Yes in S003), the target-object information update module 126 updates the display target object information table T2 that is stored in the target-object information storage module 134, using the display target object information that is acquired from the target-object information server 300 (S004).

In a case where context information is included in the request for acquiring the display target object information, the display target object information corresponding to the context information may be provided from the target-object information server 300 to the portable information terminal 100. For example, in a case where "in the middle of a meeting" is acquired as the context information, the target-object information server 300 may provide the portable information terminal 100 with the display target object information that relates to employees who attend the meeting, equipment that is present in the conference room, or the like.

Next, the user operation of the portable information terminal 100 is again performed through the target-object information acquisition module 125 (S001).

Figure 9:
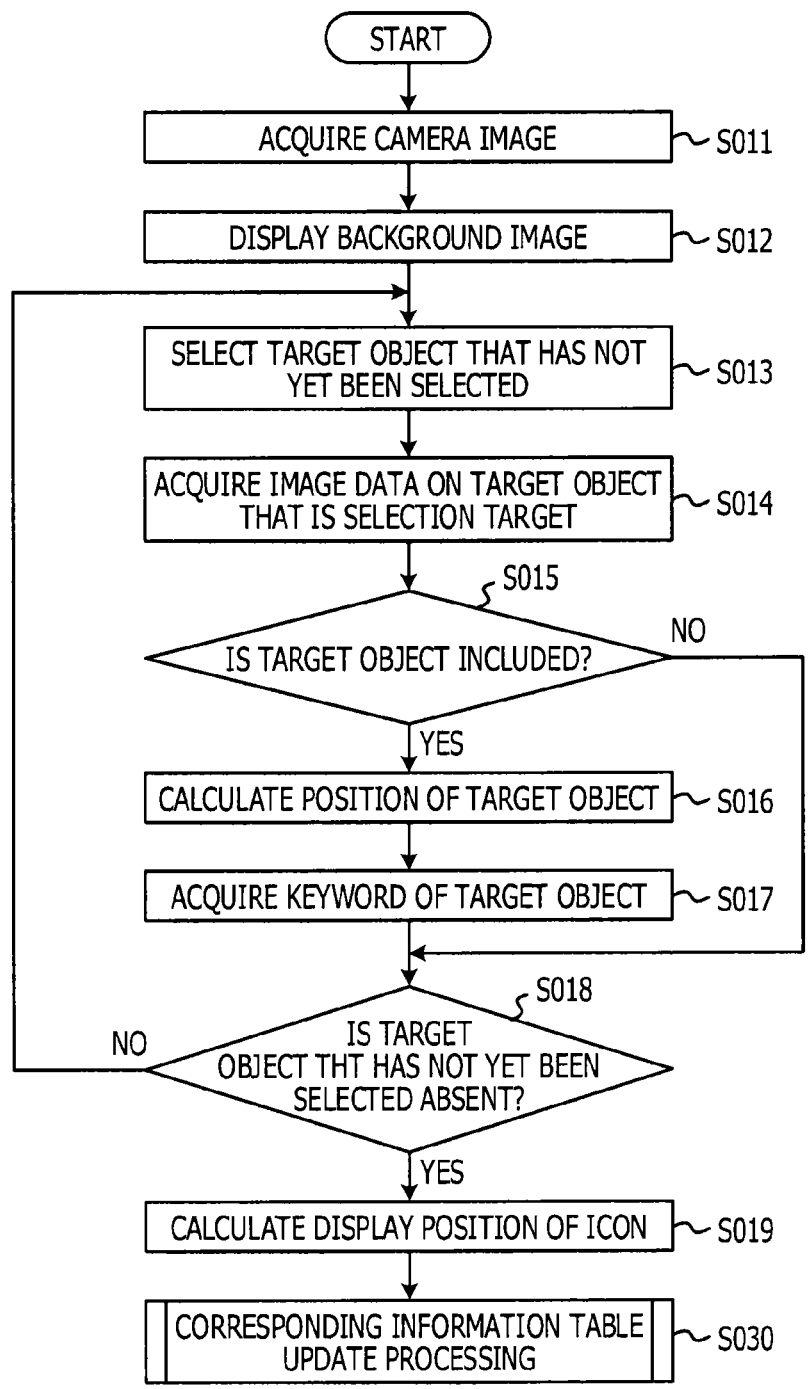
FIG. 9 is a flowchart for processing for calculating an application display position, which is performed by the portable information terminal according to the first embodiment.

FIG. 9 is a flowchart for processing for calculating an application display position, which is performed by the portable information terminal 100 according to the first embodiment.

As illustrated in FIG. 9, the camera image acquisition module 123 acquires an image that is captured by the camera 109 (S011).

Next, the background display module 124 displays the camera image that is acquired by the camera image acquisition module 123, as a background image, on the display 106 (S012).

Next, the image recognition/position acquisition module 127 selects the target object ID that has not yet been selected, from among the target objects ID that are stored in the display target object information table T2 (S013).

Next, the image recognition/position acquisition module 127 acquires the image data that is associated with the target object whose selection is in progress, that is, the target object ID of a processing target (S014).

Next, the image recognition/position acquisition module 127 performs image recognition using the image data on the target object that is a processing target, which is acquired from the display target object information table T2, and the image data on the background image that is displayed by the background display module 124. Then, the image recognition/position acquisition module 127 determines whether the target object that is the processing target is included in the background image (S015).

In a case where it is determined that the target object that is the processing target is included in the background image (Yes in S015), the image recognition/position acquisition module 127 calculates the position of the target object that is the processing target, with the background image being set to be a reference, based on the image data on the target object that is the processing target (S016).

Next, the image recognition/position acquisition module 127 acquires keywords that are associated with the target object that is the processing target, from the display target object information table T2 (S017). For example, as illustrated in FIG. 5, if a target object ID of the target object that is the processing target is "aaaa", the image recognition/position acquisition module 127 acquires "Tanaka", and "work", as the keywords.

Next, the image recognition/position acquisition module 127 determines whether or not the target object ID that has not yet been selected is absent in the display target object information table T2 (S018). Even in a case where it is not determined that the target object that is the processing target is included in the background image (No in S015), the image recognition/position acquisition module 127 determines whether or not the target object ID that has not yet been selected is absent in the display target object information table T2 (S018).

In a case where it is determined that the target object ID that has not yet been selected is absent (Yes in S018), the display position information update module 129 calculates a display position of the application icon, with the background image being set to be the reference, based on the position of the target object that is the processing target (S019). Additionally, the display position information update module 129 assigns a display position ID to the display position of the icon, and records the display position of the icon in a display position table T4. At this point, the display position ID is assigned to the display position of the icon. However, according to the present embodiment, because one display position is set for every target object, instead of the display position ID, the target object ID may be used without any change.

The display position information update module 129 may avoid displaying the icon at a position right on the target object, as a position to which the display position of the icon is shifted from the position of the target object.

Next, the corresponding information update module 128 causes processing to transition to "corresponding information table update processing" (S030). The "corresponding information table update processing" will be described in detail below.

In a case where it is not determined that the target object ID that has not yet been selected is absent (No in S018), the image recognition/position acquisition module 127 again selects the target object ID that has not yet been selected, from among the target objects ID that are recorded in the display target object information table T2 (S013).

Figure 10:
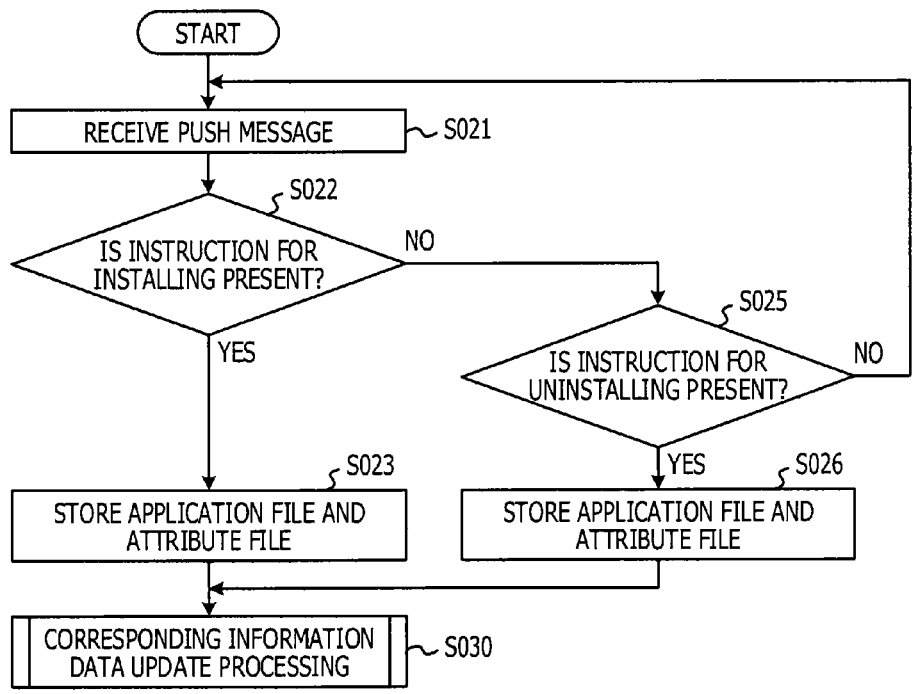
FIG. 10 is a flowchart for application information acquisition/deletion processing according to the first embodiment.

FIG. 10 is a flowchart for application information acquisition/deletion processing according to the first embodiment.

As illustrated in FIG. 10, the application information reception module 121 receives the push message from the application server 200 (S021).

Next, the application information management module 122 determines whether or not the push message from the application server 200 is an instruction for the installing of an application (S022).

In a case where it is determined that the push message is the instruction for the installation (Yes in S022), the application information management module 122 acquires (downloads) a compressed application-file that is designated according to the instruction for the installation, from the application server 200, decompresses the compressing application-file into the application file and the application information, and then stores a result of the decompression in the application information table T1 (S023). Specifically, the application information management module 122 records the application file in an "application file" in the application information table T1. Then, the application information management module 122 extracts a keyword relating to the application, from the application information, and records the keyword in a "keyword" in the application information table T1. According to the present embodiment, the application file itself is recorded in the application information table T1. However, the present disclosure is not limited to this. For example, a storage destination (a bus) of the application file may be recorded in the "application file" in the application information table T1.

Next, the corresponding information update module 128 causes processing to transition to processing to the corresponding information table update processing" (S030). The "corresponding information table update processing" will be described in detail below.

On the other hand, in a case where it is not determined that the push message is the instruction for the installing of the application (No in S022), the application information management module 122 determines whether or not the push message from the application server 200 is the instruction for the uninstalling of the application (S025).

In a case where it is determined that the push message is the instruction of the uninstalling of the application (Yes in S025), the application information management module 122 deletes the application file and the application information that are designated according to the instruction for the uninstalling of the application, from the application information table T1 (S026).

Next, the corresponding information update module 128 performs the "corresponding information table update processing" (S030).

On the other hand, in a case where it is not determined that the push message is the instruction for the uninstalling of the application (No in S025), the application information reception module 121 continues to receive the push message from the application server 200 (S021).

Figure 11:
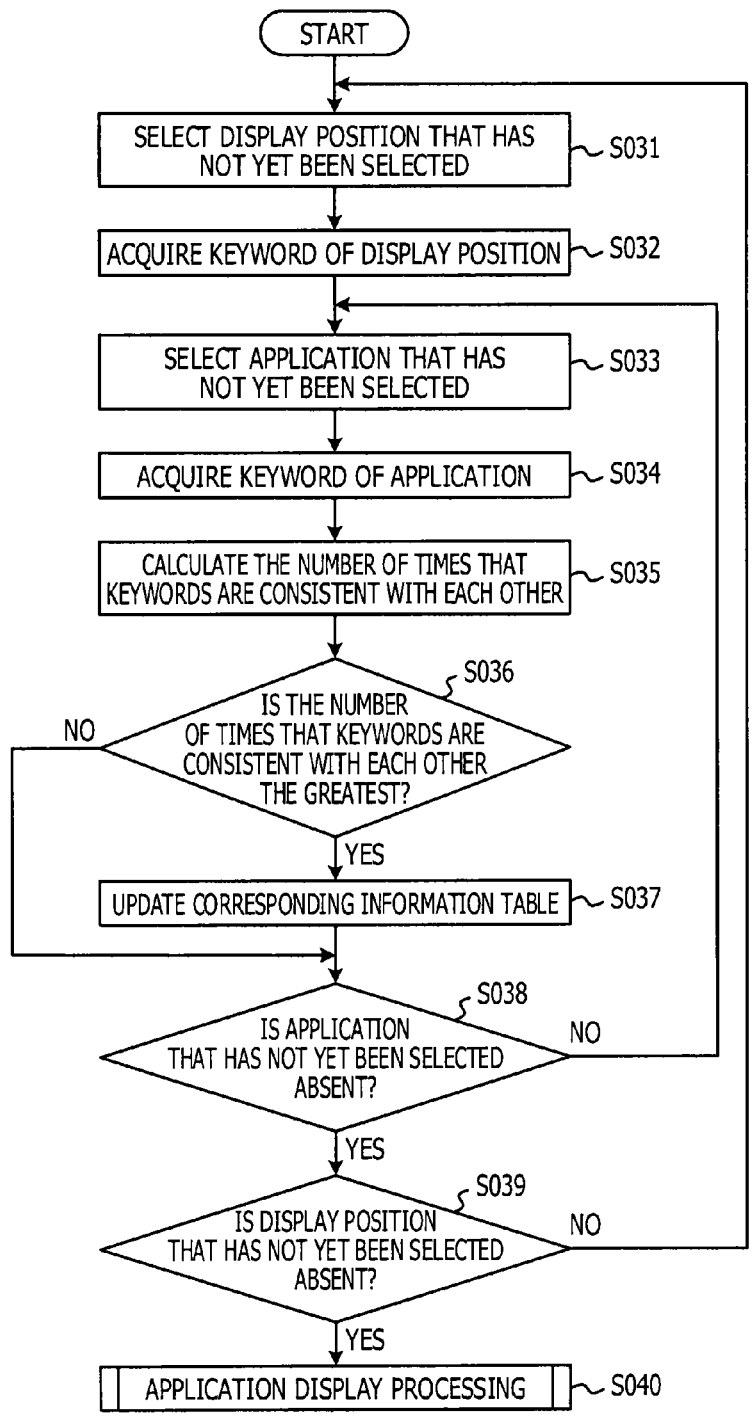
FIG. 11 is a flowchart for corresponding information table update processing by the portable information terminal according to the first embodiment.

FIG. 11 is a flowchart for the corresponding information table update processing by the portable information terminal 100 according to the first embodiment.

As illustrated in FIG. 11, the corresponding information update module 128 acquires the display position ID of the processing target from the display position ID that has not yet been selected and that is recorded in the display position information table T4 (S031).

Next, the corresponding information update module 128 acquires a keyword that is associated with the display position ID of the processing target, from the display position information table T4 (S032).

Next, the application information management module 122 acquires the application ID of the processing target from the application ID that has not yet been selected and that is recorded in the application information table T1 (S033).

Next, the application information management module 122 acquires the keyword that is associated with the application ID of the processing target, from the application information table T1 (S034).

Next, the corresponding information update module 128 calculates the number of times that the keyword that is associated with the display position ID of the processing target and the keyword of the application ID of the processing target are consistent with each other (S035).

Next, the corresponding information update module 128 determines whether or not the number of times that the keyword that is associated with the display position ID of the processing target and the keyword that is associated with the application ID of the processing target are consistent with each other is the greatest among the numbers of times that the keyword that is associated with the display position ID of the processing target and the keyword that is associated with the application ID that have been selected are consistent with each other (S036). That is, the corresponding information update module 128 determines whether or not the newly-calculated number of times that the keywords are consistent with each other is the greatest among the already-calculated numbers of times that the keywords are consistent with each other.

In a case where it is determined that the newly-calculated number of times that the keywords are consistent with each other is the greatest (Yes in S036), the corresponding information update module 128 updates the corresponding information table T3 (S037). Specifically, the corresponding information update module 128 records the display position ID of the processing target and the application ID of the processing target in the corresponding information table T3, in a state where the display position ID and the application ID are associated with each other.

Next, the corresponding information update module 128 determines whether or not the application ID that has not yet been selected is absent (S038). Even in a case where it is not determined that the newly-calculated number of times that the keywords are consistent with each other is the greatest (No in S036), the corresponding information update module 128 determines whether or not the application ID that has not yet been selected is absent (S038).

In a case where it is not determined that the application ID that has not yet been selected is absent (No in S038), the application information management module 122 again selects the application ID that has not yet been selected, from among the application IDs that are recorded in the application information table T1 (S033).

On the other hand, in a case where it is determined that the application ID that has not yet been selected is absent (Yes in S038), the corresponding information update module 128 determines whether or not the display position ID that has not yet been selected is absent (S039).

In a case where it is not determined that the display position ID that has not yet been selected is absent (No in S039), the corresponding information update module 128 again selects the display position ID that has not yet been selected, from among the display position IDs that are recorded in the display position information table T4 (S031).

On the other hand, in a case where it is determined that the display position ID that has not yet been selected is absent (Yes in S039), the corresponding information update module 128 causes the processing to transition to "application display processing" (S040).

In the corresponding information table update processing, the corresponding information update module 128 associates multiple application IDs to each display position ID.

Figure 12:
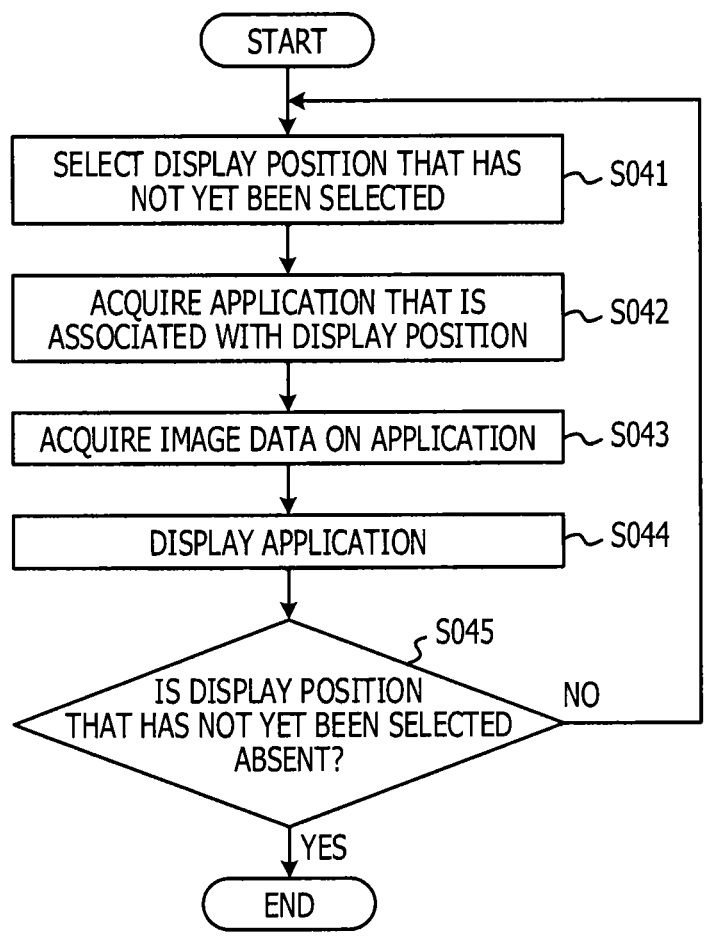
FIG. 12 is a flowchart for application display processing by the portable information terminal according to the first embodiment.

FIG. 12 is a flowchart for the application display processing by the portable information terminal 100 according to the first embodiment.

As illustrated in FIG. 12, the corresponding information/display position acquisition module 130 selects the display position ID that has not yet been selected, from among the display position IDs that are recorded in the display position information table T4 (S041).

Next, the corresponding information/display position acquisition module 130 acquires the application ID that is associated with the display position ID whose selection is in progress, that is, the display position ID of the processing target, from the corresponding information table T3 (S042).

Next, the application acquisition module 131 acquires the image data that is associated with the application ID, from the application information table T1 (S043). As the image data relating to an application, for example, the image data on the application icon and the like may be used.

Next, the application icon is displayed at the display position that is identified by the display position ID of the processing target, in the icon display module 132 (S044). In a case where multiple application IDs are associated with the display position ID, the multiple application icons are displayed at the display position in the icon display module 132.

Next, the corresponding information/display position acquisition module 130 determines whether or not the display position ID that has not yet been selected is absent (S045).

In a case where it is determined that the display position ID that has not yet been selected is absent (Yes in S045), the corresponding information/display position acquisition module 130 terminates the "application display processing".

On the other hand, in a case where it is not determined that the display position ID that has not yet been selected is absent (No in S045), the corresponding information/display position acquisition module 130 again selects the display position ID that has not yet been selected and that is recorded in the display position information table T4 (S041). That is, Steps from S041 to S044 are performed until the display position ID that has not yet been selected and that is recorded in the display position information table T4 becomes absent. In this manner, applications that are associated with any of the display position IDs that are recorded in the display position information table T4 are all displayed on the background image in a superimposed manner.

As described above, according to the present embodiment, a target object and an application are associated with each other, based on a keyword (attribute information) for the target object that is extracted from the background image and on a keyword (attribute information) that is extracted from the application. For this reason, for example, even if an application that has no relation with a user intention is installed on the portable information terminal 100, the application can be displayed being associated with the target object that is included in the background image.

Figure 13:
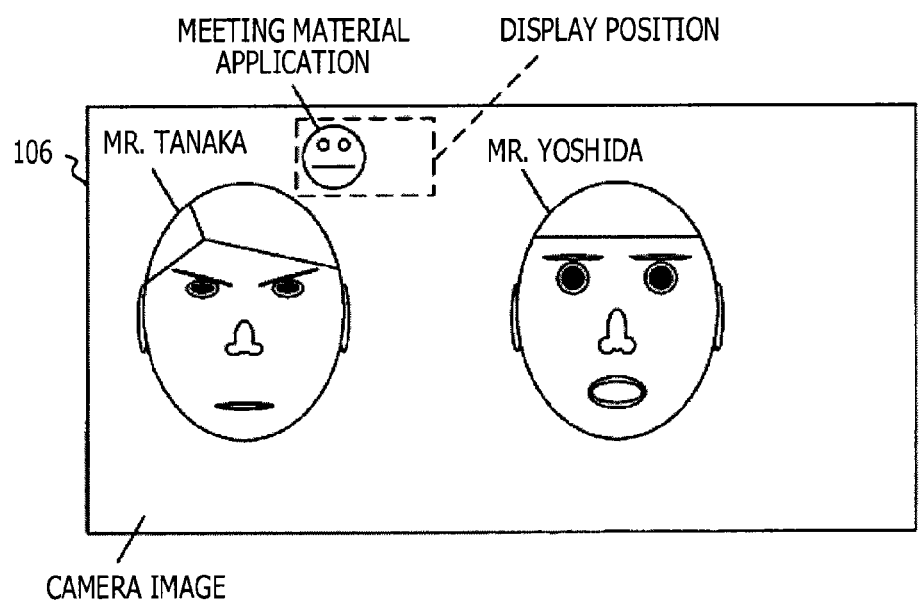
FIG. 13 is a diagram illustrating one example of a display screen according to the first embodiment.

FIG. 13 is a diagram illustrating one example of a display screen according to the first embodiment.

As illustrated in FIG. 13, when Mr. Tanaka and Mr. Yoshida who are attending a meeting are shown, as target objects, in the camera image of the portable information terminal 100, in a case where a meeting material application that is created by Mr. Tanaka is downloaded on the portable information terminal 100, an icon of the meeting material application is displayed on a display position that is set to be in the vicinity of Mr. Tanaka.

Conversely, when the meeting material application that is created by Mr. Tanaka is already downloaded on the portable information terminal 100, in a case where Mr. Tanaka and Mr. Yoshida are shown in the camera image of the portable information terminal 100, the icon of the meeting material application is displayed on the display position that is set to be in the vicinity of Mr. Tanaka.

For this reason, the user of the portable information terminal 100 can recognize the meeting material application as an application that relates to Mr. Tanaka. At this point, the displaying of the meeting material application that is created by Mr. Tanaka is described, but in a case where the meeting material application that is created by Mr. Yoshida is downloaded, the icon of the meeting material application is displayed in the vicinity of Mr. Yoshida.

According to the present embodiment, the keyword relating to the application is included in application information. However, the present disclosure is not limited to this. For example, if a string of letters and the like that are included in an application file are extracted as the keywords, the application information may not be attached to the application file. For example, attribute information, manifesto information, or the like on the application file may be used.

Additionally, according to the present embodiment, the portable information terminal 100 performs keyword matching between the target object and the application. However, the present disclosure is not limited to this. For example, after acquiring the keyword relating to the target object and the keyword relating to the application, the portable information terminal 100 transmits these to an external server, for example, the application server 200 or the target-object information server 300, and thus causes the external server to perform the keyword matching.

After acquiring the camera image, the portable information terminal 100 may transmit the camera image to the external server, and may cause the external server to perform extraction of the keyword relating to the target object.

Modification Example 1

Figure 14:
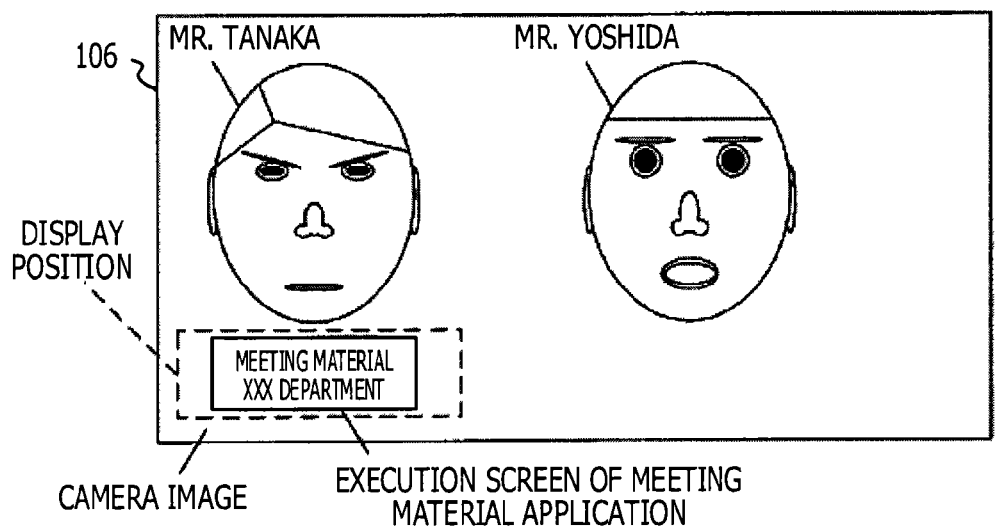
FIG. 14 is a diagram illustrating one example of a display screen of a modification example 1 according to the first embodiment.

A modification example 1 of the first embodiment is described referring to FIG. 14.

According to the first embodiment, the application icon is displayed being associated with the target object. However, the present disclosure is not limited to this. For example, instead of the application icon, an execution screen of the application may be used.

FIG. 14 is a diagram illustrating one example of a display screen of the modification example 1 according to the first embodiment.

As illustrated in FIG. 14, in the modification example 1, an execution screen of the meeting material application that is created by Mr. Tanaka is displayed on the display position that is set to be in the vicinity of Mr. Tanaka. If an execution screen of an application is displayed on this manner, the user of the portable information terminal 100 can recognize contents (for example, contents of a service and the like) of the application. Consequently, although multiple applications are displayed being associated with Mr. Tanaka, a desired application can be easily selected.

Modification Example 2

Figure 15:
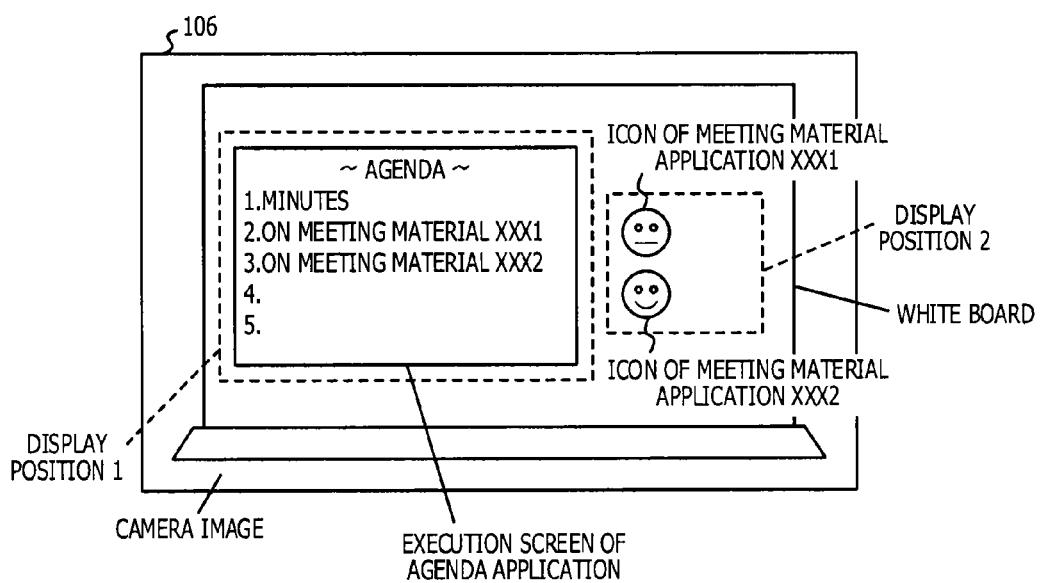
FIG. 15 is a diagram illustrating one example of a display screen according to a modification example 2 according to the first embodiment.

A modification 2 of the first embodiment is described referring to FIG. 15.

According to the first embodiment, one display position is set for every target object. However, the present disclosure is not limited to this. For example, multiple display positions may be set for each of the target objects and a different application may be displayed on each display position. That is, based on the position of the target object that is acquired by the image recognition/position acquisition module 127, a display position information update module 129 according to the modification example 2 may calculate multiple display positions and assign an individual display position ID to each display position, and thus may record a result of the assignment in the display position table T4.

FIG. 15 is a diagram illustrating one example of a display screen according to the modification example 2 according to the first embodiment.

As illustrated in FIG. 15, in the modification example 2, the execution screen of the meeting agenda application is displayed on a display position 1 that is set to be on a white board. Then, an icon of a meeting material application xxx1 and an icon of a meeting material application xxx2 are displayed on a display position 2 that is set to be on the white board. The meeting material application xxx1 and the meeting material application xxx2 are files for browsing through materials, that is, a "meeting material xxx1" and a "meeting material xxx2" that are described on an execution screen of an agenda application.

In this manner, if multiple display positions are set to be on the white board as the target object, and a different application is displayed at each display position, multiple applications that are associated with the target object can be displayed in an arranged manner. Therefore, although the multiple applications are displayed being associated with the target object, the user of the portable information terminal 100 can easily select a desired application.

Second Embodiment

A second embodiment is described referring to FIGS. 16 to 20. However, descriptions of a configuration, a function, an operation, a process, and the like that are the same as those according to the first embodiment are omitted.

A portable information terminal 100A according to the present embodiment is obtained by further providing the portable information terminal 100 according to the first embodiment with a so-called automatic activation mode in which an application that is displayed associated with a target object is automatically activated. Description will be provided below.

Figure 16:
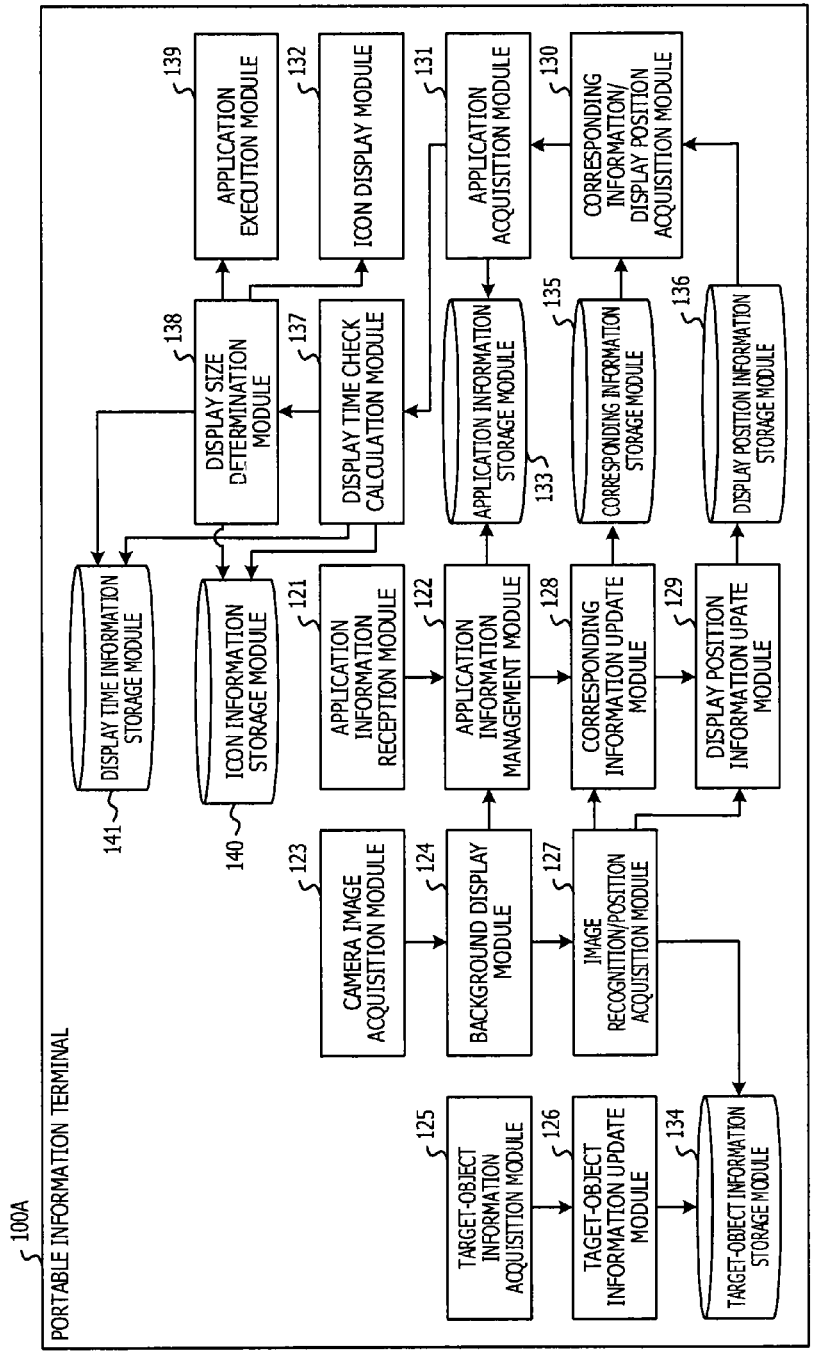
FIG. 16 is a diagram illustrating one example of a functional block of a portable information terminal according to a second embodiment.

FIG. 16 is a diagram illustrating one example of a functional block of the portable information terminal 100A according to the second embodiment.

As illustrated in FIG. 16, in addition to the portable information terminal 100 according to the first embodiment, the portable information terminal 100A according to the present embodiment further includes a display time check calculation module 137, a display size determination module 138, an application execution module 139, an icon information storage module 140, and a display time information storage module 141, as functional blocks.

Any of these functional blocks is realized by the CPU 101 reading the AR application (the control program) into the main memory 102 and executing the AR application read into the main memory 102.

The display time check calculation module 137 calculates a staying time duration from a staying starting point in time to a current point in time, based on the staying starting point in time that is recorded in a display time information table T6. Additionally, the display time check calculation module 137 determines whether or not the staying time duration is equal to or greater than a predetermined time duration.

The display size determination module 138 calculates a zoom time duration from a zoom starting point in time to a current point in time, based on the zoom starting point in time that is recorded in the display time information table T6. Additionally, the display size determination module 138 determines whether or not the zoom time duration is equal to or greater than a predetermined time duration. The display size determination module 138 increases at predetermined magnification a display size of an icon that is recorded in an icon information table T5 and thus updates (increases) the display size.

In a case where the zoom time duration is equal to or greater than the predetermined time duration, the application execution module 139 activates an application and displays an execution screen of the application on an entire display screen.

The icon information table T5 is stored in the icon information storage module 140.

The display time information table T6 is stored in the display time information storage module 141.

The icon information table T5 and the display time information table T6 will be both described in detail below.

Figure 17:
FIG. 17 is a diagram illustrating one example of an icon information table according to the second embodiment.

FIG. 17 is a diagram illustrating one example of the icon information table T5 according to the second embodiment.

As illustrated in FIG. 17, in the icon information table T5, a display position of and a display size of an application are associated with an application that is identified by each application ID. The display position is not a "display range where an application can be displayed" according to the first embodiment, and is a position at which an application icon is displayed without any change. According to the present embodiment, coordinate components of an icon, that is, "x" and "y" are used as the display position. The display size is a size at which the application icon is displayed. Particularly, a unit of display size is not limited. For example, the number of pixels in one side of a minimum-sized rectangle that includes an icon and the like may be used. The display size is rewritten by the display size determination module 138. For example, in a specific example that is described in the first row in a table, "(15, 24)" as a display position (x, y) of an icon and "200" as a display size are associated with the application that is identified by the application ID "xxxx".

Figure 18:
FIG. 18 is a diagram illustrating one example of a display time information table according to the second embodiment.

FIG. 18 is a diagram illustrating one example of the display time information table T6 according to the second embodiment.

As illustrated in FIG. 18, the display time information table T6 associates the staying starting point in time and the zoom starting point in time with an icon of an application that is identified by each application ID. The staying starting point in time is a starting point in time of staying determination processing, that is, a point in time at which an icon is first displayed in a predetermined range after transition to the automatic activation mode in the portable information terminal 100A. The zoom starting point in time is a starting point in time of zoom activation processing. For example, in a specific example in the first row in a table, "2012/12/15 T13:01:05" as a staying starting point in time and "2012/12/15 T13:01:15" as a zoom starting point in time are associated with an icon of the application that is identified by the application ID "xxxx". The staying starting point in time is rewritten by the display time check calculation module 137. The zoom starting point in time is rewritten by the display size determination module 138.

Figure 19:
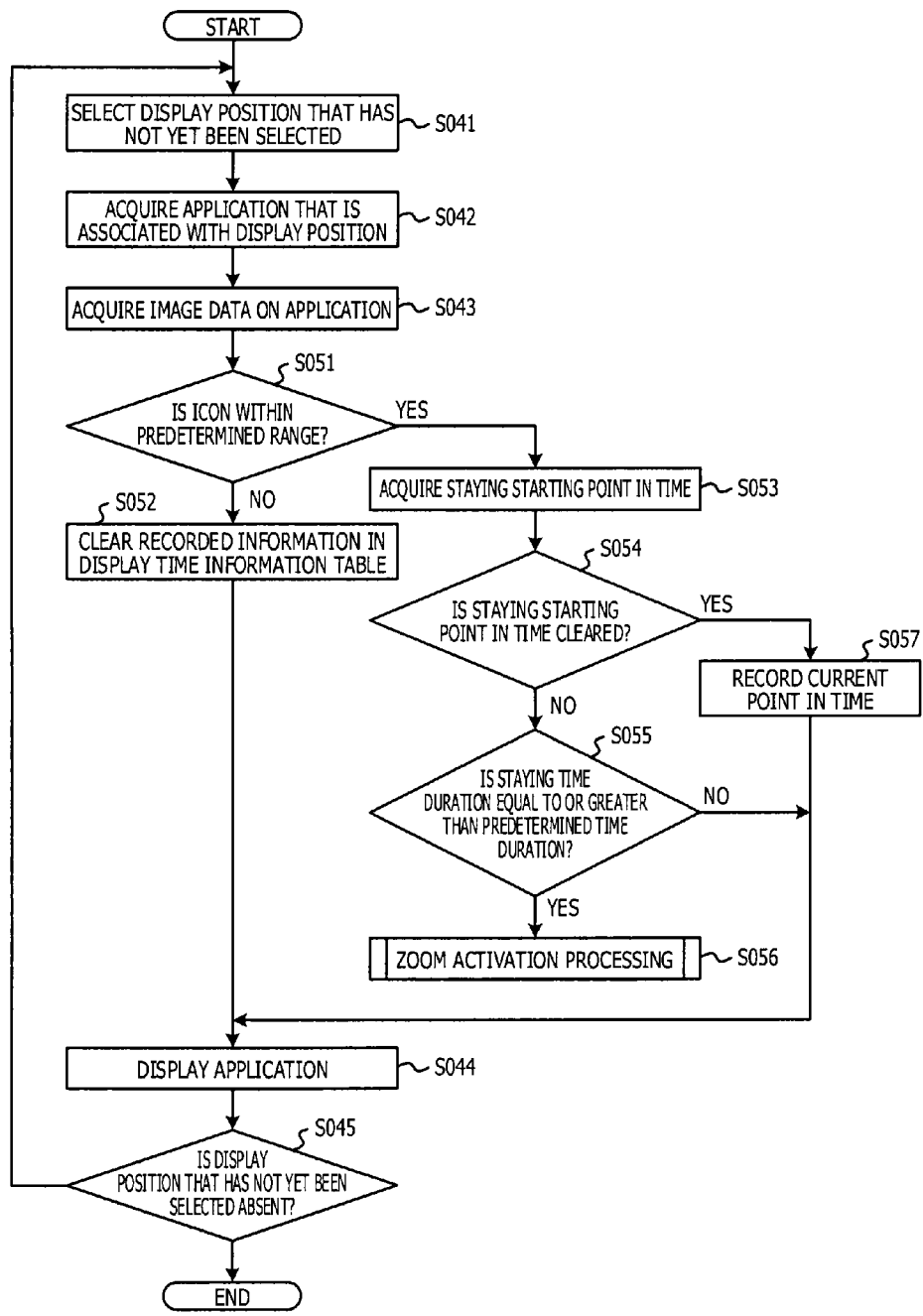
FIG. 19 is a flowchart for staying determination processing by the portable information terminal according to the second embodiment.

FIG. 19 is a flowchart of the staying determination processing by the portable information terminal 100A according to the second embodiment.

As illustrated in FIG. 19, after acquiring the image data of the application (S043), the display time check calculation module 137 determines whether or not an immediately-preceding icon is included in a predetermined range, based on the icon information table T5 that is stored in the icon information storage module 140 (S051).

In a case where it is not determined that the immediately-preceding icon is included in the predetermined range (No in S051), the display time check calculation module 137 clears recorded information (the staying starting point in time) in the display time information table T6 that is stored in the display time information storage module 141 (S052).

Next, as is the case with the first embodiment, the application icon is displayed on the display position that is identified by the display position ID of the processing target, in the icon display module 132 (S044).

On the other hand, in a case where it is determined that the immediately-preceding icon is included in the predetermined range (Yes in S051), the display time check calculation module 137 acquires the staying starting point in time from the display time information table T6 that is stored in the display time information storage module 141 (S053).

Next, the display time check calculation module 137 determines whether or not the recorded information (the staying starting point in time) in the display time information table T6 is cleared (S054).

At this point in a case where it is determined that the recorded information in the display time information table T6 is cleared (Yes in S054), that is, in a case where the staying starting point in time is not recorded in the display time information table T6, the display time check calculation module 137 records a current point in time as the staying starting point in time in the display time information table T6 (S057).

Next, as is the case with the first embodiment, the application icon is displayed, in a superimposed manner, on the display position that is identified by the display position ID of the processing target, in the icon display module 132 (S044).

On the other hand, in a case where it is not determined that the display time information table T6 is cleared (No in S054), that is, in a case where the staying starting point in time is recorded in the display time information table T6, the display time check calculation module 137 determines whether or not a difference between the staying starting point in time and the current point in time, that is, the staying time duration is equal to or greater than the predetermined time duration (S055).

At this point, in a case where it is determined that the staying time duration is equal to or greater than the predetermined time duration (Yes in S055), the display time check calculation module 137 causes the processing to transition to the "zoom activation processing" (S056).

On the other hand, in a case where it is not determined that the staying time duration is equal to or greater than the predetermined time duration (No in S055), as is the case with the first embodiment, the icon display module 132 displays the application icon on the display position that is identified by the display ID of the processing target in a superimposed manner (S044).

As described above, when the staying time duration during which the application icon stays within a predetermined range reaches a predetermined time, the portable information terminal 100A starts the zoom activation processing.

Figure 20:
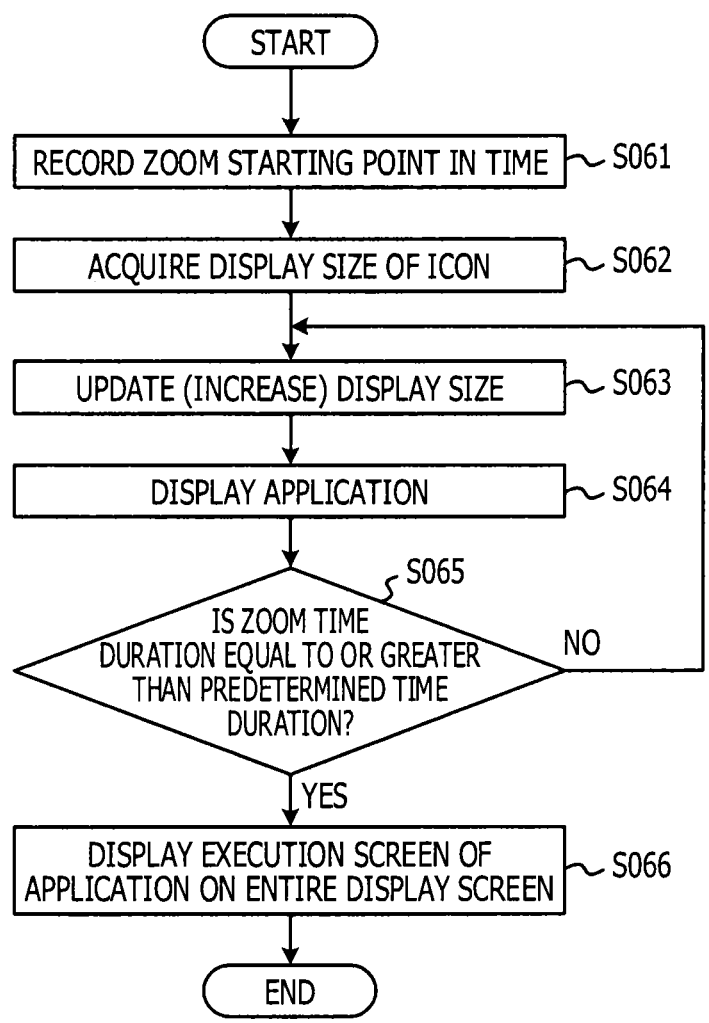
FIG. 20 is a flowchart for zoom activation processing by the portable information terminal according to the second embodiment.

FIG. 20 is a flowchart for the zoom activation processing by the portable information terminal 100A according to the second embodiment.

As illustrated in FIG. 20, the display size determination module 138 records the zoom starting point in time in the display time information table T6 that is stored in the display time information storage module 141 (S061).

Next, the display size determination module 138 acquires the display size of the icon from the icon information table T5 (S062).

The display size determination module 138 increases at predetermined magnification the display size of the icon and thus updates (increases) the display size (S063). Additionally, the display size determination module 138 increases the display size that is recorded in the icon information table T5, based on the post-update display size.

Next, the icon display module 132 displays the application icon at the post-update display size (S064). Specifically, the icon display module 132 displays the application icon at the display size of the icon that is recorded in the icon information table T5.

Next, the display size determination module 138 determines whether or not a difference between the zoom starting point in time and the current point in time, that is, the zoom time duration, is equal to or greater than the predetermined time duration (S065).

At this point, in a case where it is not determined that the zoom time duration is equal to or greater than the predetermined time duration (No in S065), the display size determination module 138 again increase the display size of the icon at the predetermined magnification and thus updates the display size (S063). That is, the display size determination module 138 gradually increases the display size of the icon until a predetermined time has elapsed after the zoom activation processing of the icon was started.

On the other hand, in a case where it is determined that the zoom time duration is equal to or greater than the predetermined time duration (Yes in S065), the icon display module 132 displays the execution screen of the application on the entire display screen (S066).

When the time that has elapsed after the zoom activation processing of the icon was started reaches a predetermined time, the portable information terminal 100A automatically executes an application. That is, the user of the portable information terminal 100A, for example, can execute a desired application without performing a touch operation. Therefore, the time and effort of the user of the portable information terminal 100A can be saved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method for displaying an image executed by a processor included in an information processing device, the information processing device further including a camera, a memory and a screen, the control method comprising:
    capturing a camera image using the camera;
    receiving an application;
    extracting one or more content keywords that include a writer name or a type from the application;
    when a user operation of the information processing device is performed, acquiring display target object information, in which an identifier identifying a target object, image information of the target object, and one or more target object keywords of the target object are associated, from a server, the one or more target object keywords including an object name or an object type;
    updating display target object information stored in the memory using the acquired display target object information;
    determining whether the target object is included in the camera image by performing image recognition using the image information on the target object and the camera image;
    calculating a position of the target object on the camera image, based on the image information on the target object, when the target object is determined to be included in the camera image;
    determining whether the one or more content keywords and the one or more target object keywords included in the updated display target object information have a correspondence relationship, when the target object is determined to be included in the camera image;
    acquiring an image relating to the application from the memory;
    calculating a display position of the image relating to the application, based on the position of the target object, when the one or more content keywords and the one or more target object keywords are determined to have the correspondence relationship; and
    displaying the camera image and the image relating to the application on the screen, the image relating to the application being in a state of being superimposed onto the camera image, at the display position.

2. The control method according to claim 1, wherein the receiving is downloading the application from an application server to the information processing device by being triggered by an instruction from the application server.

3. The control method according to claim 2, wherein the acquiring of the display target object information includes transmitting an instruction to make a request to transmit the display target object information from the information processing device to a device other than the application server and receiving the display target object information from the device.

4. The control method according to claim 1, wherein the calculating of the display position includes determining whether a position that is shifted from a position of the target object, as the display position, in such a manner that the display position is not superimposed onto the target object on the screen.

5. The control method according to claim 1, wherein the image relating to the application is an icon of the application.

6. The control method according to claim 1, further comprising:
    starting execution processing relating to the application when the display position of the image relating to the application stays in a predetermined range of a display screen of the information processing device for a predetermined time.

7. The control method according to claim 6, wherein the execution processing relating to the application includes
    setting a starting point in time of processing that increases a display size of the image relating to the application, which is displayed on the screen,
    starting to increase the display size in accordance with the starting point in time, and
    increasing the display size gradually until a predetermined time elapses.

8. An information processing device, comprising:
    a camera that captures a camera image;
    a screen;
    a memory; and
    a processor coupled to the memory and configured to:
        receive an application,
        extract one or more content keywords that include a writer name or a type from the application,
        when a user operation of the information processing device is performed, acquire display target object information, in which an identifier identifying a target object, image information on the target object, and one or more target object keywords of the target object are associated, from a server, the one or more target object keywords including an object name or an object type,
        update display target object information stored in the memory using the acquired display target object information, determine whether the target object is included in the camera image by performing image recognition using the image information on the target object and the camera image, calculate a position of the target object on the camera image, based on the image information on the target object, when the target object is determined to be included in the camera image, determine whether the one or more content keywords and the one or more target object keywords included in the updated display target object information have a correspondence relationship, when the target object is determined to be included in the camera image, acquire an image relating to the application from the memory, calculate a display position of the image relating to the application, based on the position of the target object, when the one or more content keywords and the one or more target object keywords are determined to have the correspondence relationship, and display the camera image and the image relating to the content application on the screen, the image relating to the application being in a state of being superimposed onto the camera image, at the display position.

9. The information processing device according to claim 8, wherein the processor is configured to download the application from an application server to the information processing device by being triggered by an instruction from the application server.

10. The information processing device according to claim 9, wherein the processor is configured to transmit an instruction to make a request to transmit the display target object information from the information processing device to a device other than the application server and receiving the display target object information from the device.

11. A non-transitory computer-readable recording medium storing a program that causes a processor included in an information processing apparatus to execute a process, the information processing device further including a camera, a memory and a screen, the process comprising:

capturing a camera image using the camera;

receiving an application;

extracting one or more content keywords that include a writer name or a type from the application;

when a user operation of the information processing device is performed, acquiring display target object information, in which an identifier identifying a target object, image information of the target object, and one or more target object keywords of the target object are associated, from a server, the one or more target object keywords including an object name or an object type;

updating display target object information stored in the memory using the acquired display target object information;

determining whether the target object is included in the camera image by performing image recognition using the image information on the target object and the camera image;

calculating a position of the target object on the camera image, based on the image information on the target object, when the target object is determined to be included in the camera image;

determining whether the one or more content keywords and the one or more target object keywords included in the updated display target object information have a correspondence relationship, when the target object is determined to be included in the camera image;

acquiring an image relating to the application from the memory;

calculating a display position of the image relating to the application, based on the position of the target object, when the one or more content keywords and the one or more target object keywords are determined to have the correspondence relationship; and displaying the camera image and the image relating to the application on the screen, the image relating to the application being in a state of being superimposed onto the camera image, at the display position.

* * * * *